(12) United States Patent
Muterspaugh (10) Patent No.: US 7,215,939 B2
(45) Date of Patent: May 8, 2007

(54) APPARATUS AND METHOD FOR DETECTING RIPPLES CAUSED BY MULTIPATH PROPAGATION AND CONTROLLING RECEIVING ANTENNA AND TUNER

(75) Inventor: Max Ward Muterspaugh, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 649 days.

(21) Appl. No.: 10/484,899

(22) PCT Filed: Aug. 2, 2001

(86) PCT No.: PCT/US01/24520

§ 371 (c)(1),
(2), (4) Date: Jan. 26, 2004

(87) PCT Pub. No.: WO03/013021

PCT Pub. Date: Feb. 13, 2003

(65) Prior Publication Data

US 2004/0192209 A1    Sep. 30, 2004

(51) Int. Cl.
H04B 1/10    (2006.01)
H04B 1/04    (2006.01)
H04B 1/16    (2006.01)

(52) U.S. Cl. .................. 455/296; 455/114.2; 455/340; 375/285; 375/332

(58) Field of Classification Search ............... 455/296, 455/63.1, 67.11, 67.13, 114.2, 115.1, 222, 455/202, 226.1, 293, 340; 345/367, 368; 375/285

See application file for complete search history.

(56) References Cited

U.S. PATENT DOCUMENTS

| 5,325,130 | A | * | 6/1994 | Miller et al. ................. 348/614 |
| 5,526,378 | A |   | 6/1996 | Knutson et al. ............. 375/229 |
| 5,748,686 | A | * | 5/1998 | Langberg et al. ........... 375/367 |
| 5,815,529 | A | * | 9/1998 | Wang ........................... 375/285 |
| 5,828,694 | A |   | 10/1998 | Schipper ..................... 375/208 |

(Continued)

FOREIGN PATENT DOCUMENTS

| DE | 3536169 | 4/1987 |
| GB | 2196211 | 4/1988 |

OTHER PUBLICATIONS

Liam Devlin et al, "Perform Multipath Testing In High-Data-Rate Systems", MICROWAVES & RF, Feb. 1999, pp. 107-108, 111-112, 114 and 116.

(Continued)

*Primary Examiner*—Tony T. Nguyen
(74) *Attorney, Agent, or Firm*—Joseph J. Laks; Robert D. Shedd; Brian J. Cromarty (57) ABSTRACT

Improved signal reception is provided in a digital television signal received by identifying and mitigating multipath signal effects prior to demodulation and equalization. According to an exemplary embodiment, a digital television signal is received having multipath signal effects which cause a plurality of ripples in the received signal. The amplitude of at least one of the ripples and the frequency separation between at least two of the ripples are detected. At least one of an antenna and a tuner is controlled in dependence upon the detection. Signal demodulation and equalization operations may be performed after at least one of the antenna and the tuner is controlled.

18 Claims, 5 Drawing Sheets

U.S. PATENT DOCUMENTS

| | | | |
|---|---|---|---|
| 5,903,597 A | 5/1999 | Pon | 375/209 |
| 5,963,601 A | 10/1999 | Pon et al. | 375/346 |
| 6,002,361 A | 12/1999 | Schipper | 342/357 |
| 6,081,301 A | 6/2000 | Limberg | 348/614 |
| 6,084,927 A | 7/2000 | Pon | 375/343 |
| 6,128,337 A | 10/2000 | Schipper et al. | 375/229 |
| 6,219,379 B1 | 4/2001 | Ghosh | 375/232 |

OTHER PUBLICATIONS

Mark Kolber et al. "Measuring multipath in the wireless cable environment", RF TUTORIAL, Feb. 1999, pp. 52-54, 58, 60, 62, 64 and 71-74.

International Broadcasting Convention, Sep. 12-16, 1996, pp. 68-72.

Search report dated Jul. 26, 2002.

\* cited by examiner

FIG. 1

IF SIGNAL WITHOUT
MULTIPATH DISTORTION

FIG. 2A

IF SIGNAL WITH
MULTIPATH DISTORTION

APPARATUS AND METHOD FOR DETECTING RIPPLES CAUSED BY MULTIPATH PROPAGATION AND CONTROLLING RECEIVING ANTENNA AND TUNER

This application claims the benefit, under 35 U.S.C. § 365 of International Application PCT/US01/24520, filed Aug. 2, 2001, which was published in accordance with PCT Article 21(2) on Feb. 13, 2003 in English.

BACKGROUND

1. Field of the Invention

The present invention generally relates to controlling signal reception in television signal receivers, such as a digital television receiver, and more particularly, to an apparatus and method for detecting multipath signal effects in order to provide improved signal reception.

2. Background Information

Multipath signal effects, or simply multipath, can be a significant problem in wireless communication systems. Multipath occurs when two or more propagation paths exist between transmitting and receiving sites. A transmitted signal may arrive at the receiving site from multiple paths exhibiting various amounts of delay and attenuation. The multiple paths may result from reflections from man-made or natural structures, repeaters or the use of multiple transmitters.

The effect of multipath on conventional analog signals, such as National Television System Committee (NTSC) television signals, results in a ghost-like image horizontally displaced from the main image by an amount proportional to the reflected signal's delay. Multipath degradation is not visible in a digitally demodulated picture until a threshold is reached, resulting in a loss of demodulation lock. In a digital television signal receiver, uncorrected multipath introduces intersymbol interference (ISI) which increases the risk of decoding errors. The use of adaptive equalizers in the receiver can reduce the effects of multipath and improve system performance. However, multipath outside the time range of the adaptive equalizer is perceived as additional noise and causes degradation to the received signal-to-noise (S/N) ratio.

Conventional techniques for reducing the effects of multipath in digital television receivers generally attempt to operate upon a digital signal after it has been demodulated and converted into a digital bitstream. However, this type of technique has several problems. First, if the multipath effects are severe enough, it may not be possible to acquire a demodulation lock since carrier and timing signals can not be recovered. For example, in a digital television signal receiver utilizing vestigial sideband (VSB) demodulation, multipath effects may be such that the pilot carrier can not be recovered. Moreover, if there is a null on the side opposite the pilot carrier, timing recovery may not be possible.

Even in cases where carrier and timing signals can be recovered, this process inevitably takes longer when multipath is present. Accordingly, the time required to obtain a demodulation lock and perform signal equalization is longer when multipath is present. In view of these deficiencies, it is recognized herein that it is desirable to identify and rectify multipath signal effects prior to demodulation and equalization. The present invention addresses these and other issues.

SUMMARY

In accordance with an aspect of the invention, an apparatus comprises tuning means for receiving an RF signal from a source of RF signal, the RF signal having multipath signal effects which cause a plurality of ripples in the received signal. The apparatus includes multipath detection means for detecting the amplitude of at least one of the ripples and the frequency separation between at least two of the ripples, and the multipath detection means controlling at least one of the tuning means and the RF signal source in response to the detection of the amplitude and the frequency separation.

In accordance with another aspect of the invention, a method for controlling signal reception comprises steps of receiving a signal from a source of RF signal, the RF signal having a plurality of ripples caused by multipath signal effects, detecting the amplitude of at least one of the ripples and the frequency separation between at least two of the ripples, and controlling at least one of tuning means and the RF signal source in response to the detection of the amplitude and the frequency separation.

The exemplifications set out herein illustrate preferred embodiments of the invention, and such exemplifications are not to be construed as limiting the scope of the invention in any manner.

DESCRIPTION OF THE PREFERRED EMBODIMENTS

This application discloses an apparatus and method for controlling signal reception which provides advantages over conventional techniques. The present invention is particularly applicable to apparatuses receiving digital television signals, such as digital television signal receivers, as described in details below. However, the present invention is also applicable to conventional analog television signal receivers. In addition, the inventive solution disclosed herein can also be utilized to solve the multipath problems associated with digital radio signal receivers.

According to a preferred exemplary embodiment, an apparatus for controlling signal reception comprises tuning means for receiving a digital broadcast signal, such as a digital television signal, from a source of RF signal. When such a digital broadcast signal is influenced by undesirable multipath signal effects, a plurality of ripples arise in the received signal. The apparatus includes multipath detection means for detecting the amplitude of at least one of the ripples and the frequency separation between at least two of the ripples. In case of receiving an analog television signal, the multipath detection means detects the difference between the amplitude of the picture carrier signal and that of the sound carrier signal. At least one of an RF signal source, such as an antenna, and the tuning means, such as a tuner, is controlled by the multipath detection means in response to the aforementioned detection. The apparatus further comprises demodulation means for demodulating an output signal of the tuning means after the multipath detection means and controls at least one of the RF signal source and the tuning means.

Figure 1:
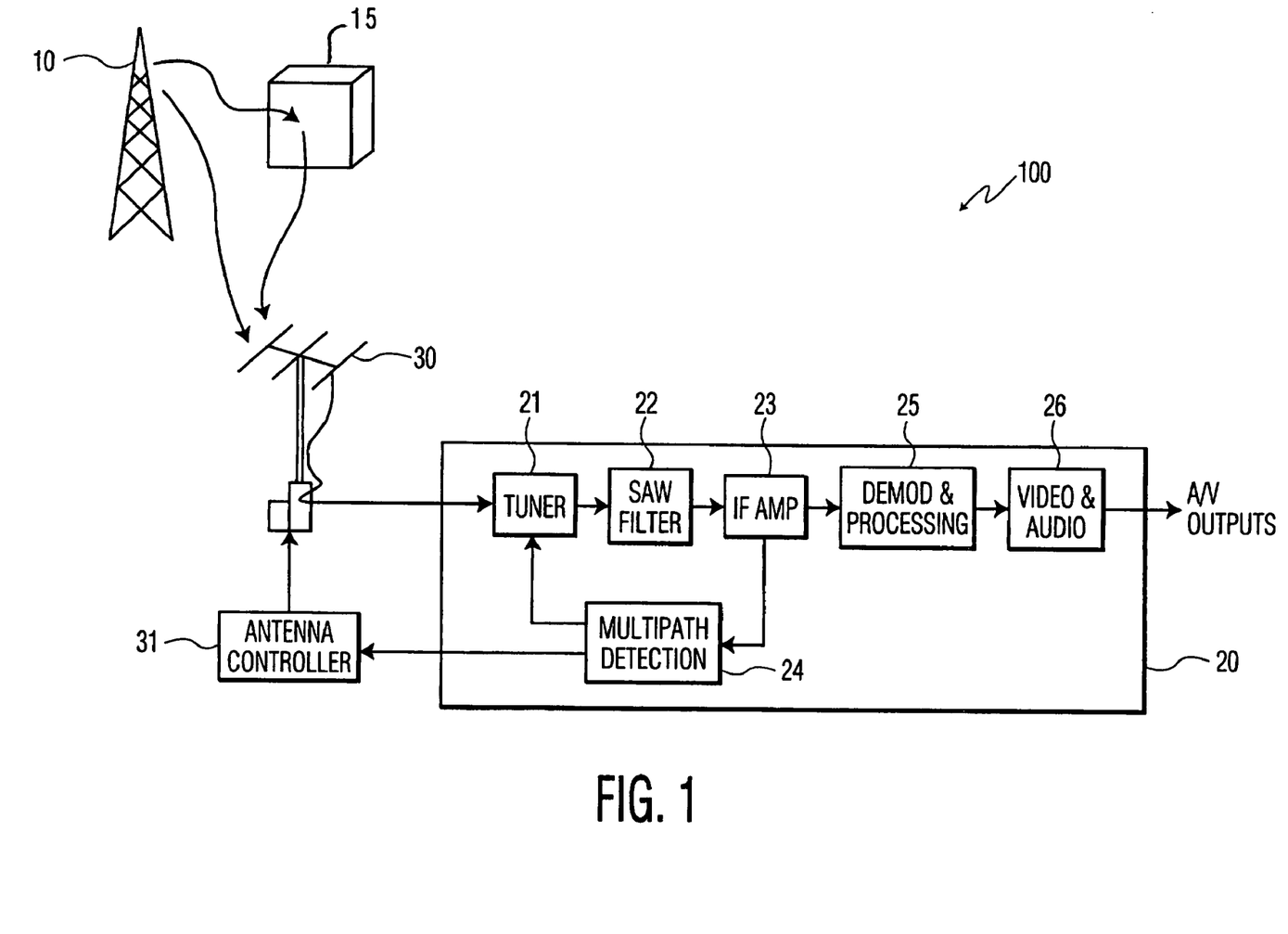
FIG. 1 is a schematic diagram of an exemplary apparatus suitable for implementing the present invention.

Referring now to the drawings, and more particularly to FIG. 1, a schematic diagram of an exemplary television signal receiver 20 suitable for implementing the present invention is shown. FIG. 1 shows broadcast antenna 10 which transmits television signals. Television signal receiver 20 receives the television signals transmitted by broadcast antenna 10 and operates upon the television signals to provide audio and/or video (A/V) outputs.

More specifically, an antenna 30 receives the television signals transmitted by the broadcast antenna 10 and provides the received signals to television receiver 20. As indicated in FIG. 1, some of the signals transmitted by the broadcast antenna 10 are received directly by antenna 30, while other signals are received by antenna 30 after being reflected from structure 15, such as a building or other object. These reflected signals are delayed in time relative to the directly received signals thereby producing undesirable multipath signal effects (i.e., distortion).

Television signal receiver 20 includes tuner 21 which receives signals from antenna 30 and performs a signal tuning operation upon the received signals. In particular, tuner 21 performs signal filtering and frequency conversion operations to produce an intermediate frequency (IF) signal, which according to an embodiment is centered at 44 MHz. Surface acoustic wave (SAW) filter 22 receives the IF signal from tuner 21 and performs a filtering operation upon the IF signal to produce a filtered IF signal. IF amplifier 23 receives the filtered IF signal from SAW filter 22 and amplifies the filtered IF signal to produce an amplified IF signal.

Television signal receiver 20 includes multipath detection unit 24 which receives a sample of the amplified IF signal from IF amplifier 23, detects multipath signal effects therein, and enables a control function based on the detection. With respect to the reception of digital television signals, multipath detection unit 24 receives the amplified IF signal having multipath signal effects which cause a plurality of ripples in the signal, and detects the amplitude of at least one of the ripples and the frequency separation between at least two of the ripples. With respect to the reception of analog television signals, multipath detection unit 24 detects the difference between the amplitude of the picture carrier signal and that of the sound carrier signal. Based on this detection, multipath detection unit 24 controls at least one of antenna 30 via antenna controller 31 and filtering operations of tuner 21. Further details regarding operation of multipath detection unit 24 will be provided later herein.

Television signal receiver 20 also includes demodulation and processing unit 25 which performs signal demodulation and processing (e.g., equalization) operations. Processing means such as a video and audio processing unit 26 is also provided to perform video and audio processing operations. In accordance with principles of the present invention, demodulation and processing unit 25 and video and audio processing unit 26 do not operate upon signals until after multipath signal effects have been detected and compensated for by multipath detection unit 24. By identifying and mitigating multipath signal effects prior to demodulation, the present invention provides advantages, such as reducing the probability of losing demodulation lock on received signals in the reception of digital television signals.

Figure 2A:
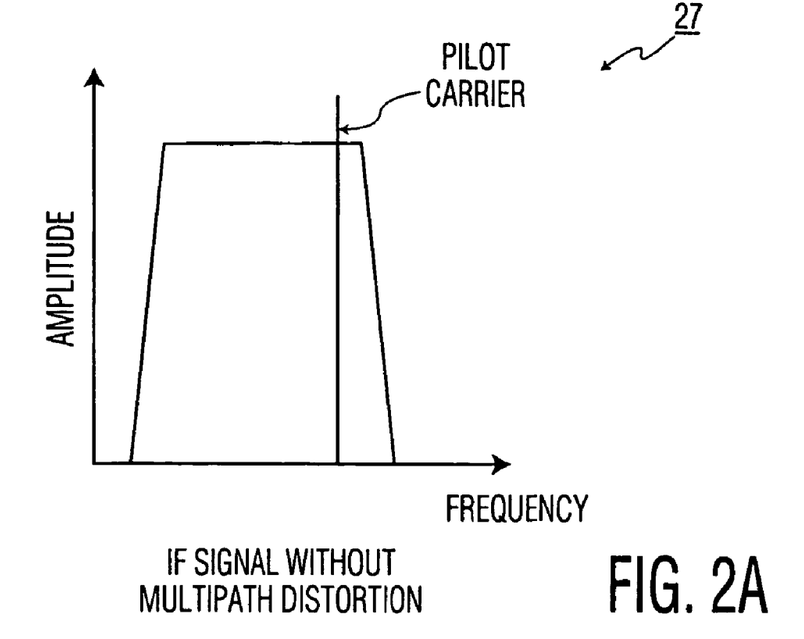
FIG. 2 is a schematic diagram illustrating a comparison between a normal signal and a signal having multipath distortion.
Figure 2B:
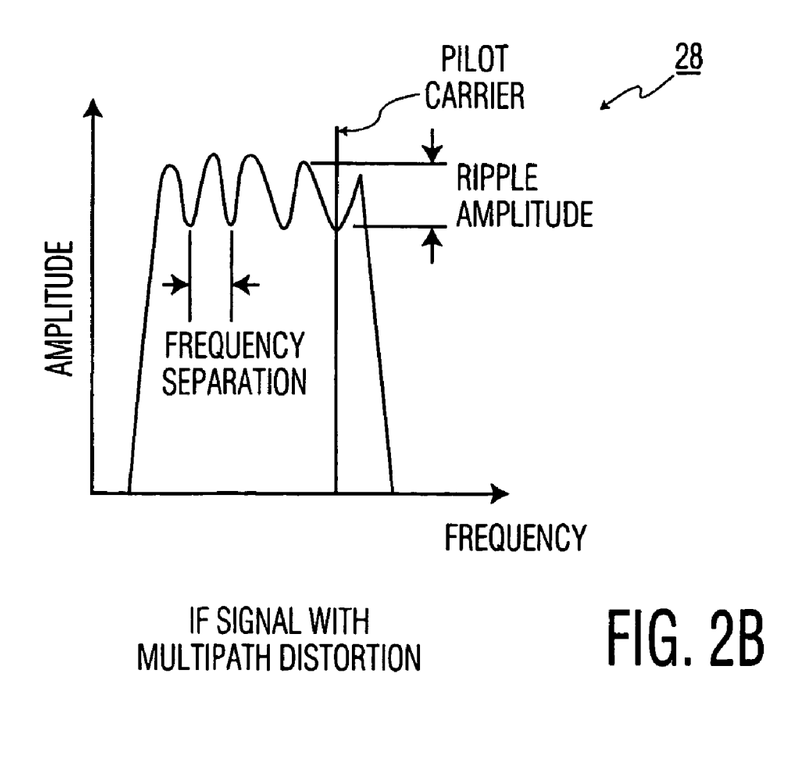

Referring now to FIG. 2, the diagram illustrates a comparison between normal digital television signal 27 and digital television signal 28 having multipath distortion. For purposes of explanation and example, signals 27 and 28 are represented as VSB digital television signals having a pilot carrier. FIG. 2 shows normal digital television signal 27 at the IF sampling point. As indicated, normal signal 27 is an IF signal without multipath distortion. Conversely, signal 28 illustrates the addition of multipath distortion to normal signal 27. As shown in FIG. 2, signal 28 includes ripples in its envelope caused by constructive and destructive multipath signal additions which vary with frequency. The frequency separation of each ripple is proportional to one divided by the multipath signal delay time. The amplitude of each ripple is proportional to the amplitude of the multipath signal.

Figure 3:
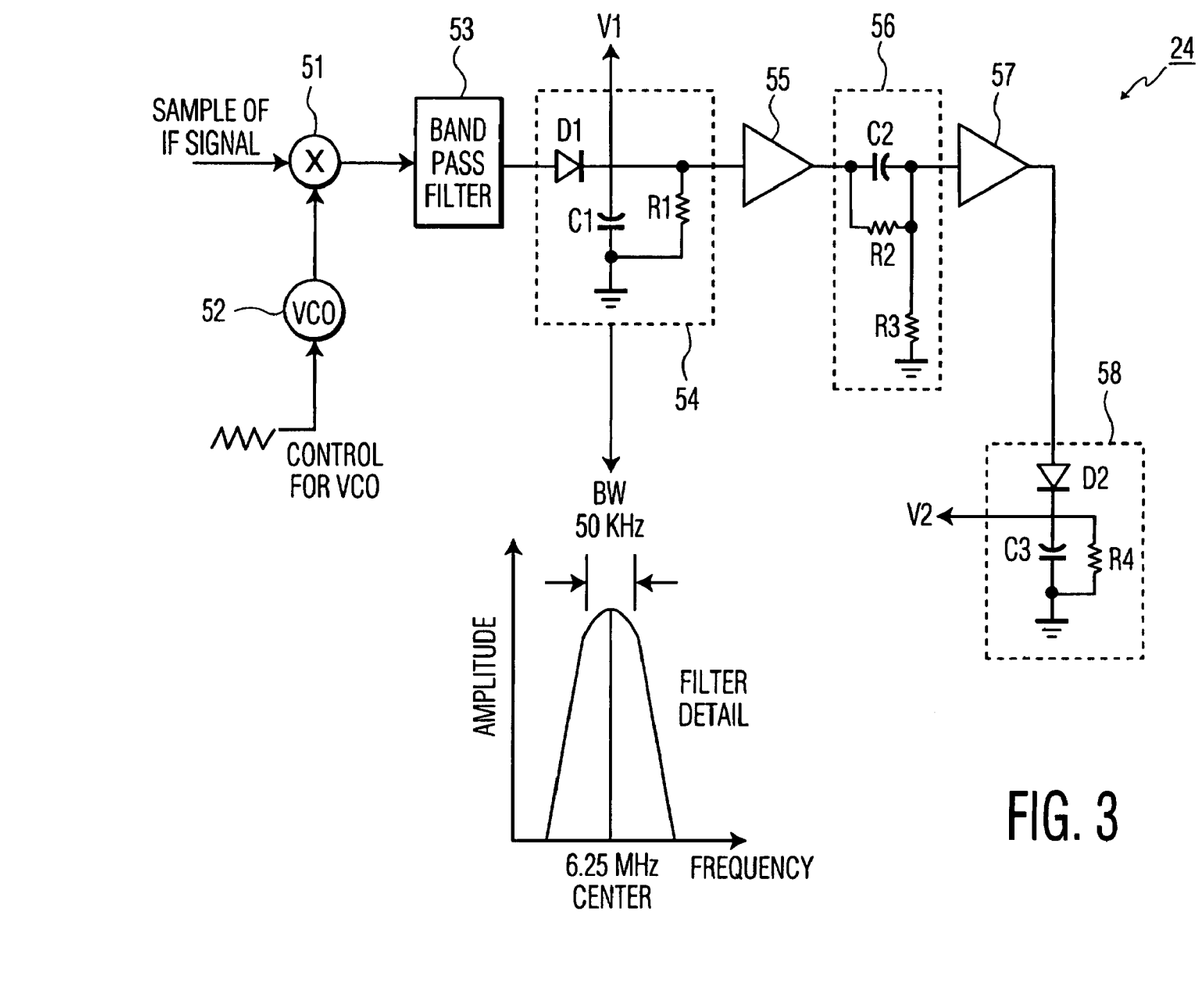
FIG. 3 is a schematic diagram illustrating details of a first embodiment of a multipath detection unit constructed according to principles of the present invention.

Referring to FIG. 3, the diagram illustrates details of a first embodiment of multipath detection unit 24 for digital television signals constructed according to principles of the present invention. In FIG. 3, mixer 51 receives a sample of an IF signal provided by IF amplifier 23 of FIG. 1. Mixer 51 mixes the received IF signal with a signal provided by voltage-controlled oscillator (VCO) 52 to convert the received IF signal to a lower frequency. According to an exemplary embodiment, a 100 Hz triangular wave is used to sweep VCO 52 between 47.25 MHZ and 53.25 MHZ. Band pass filter 53 receives and filters the frequency converted IF signal provided by mixer 51 to separate a portion of the frequency shifted IF signal in the 6.25 MHz range. Details regarding operation of band pass filter 53 are graphically depicted in FIG. 3. In particular, band pass filter 53 produces a filtered output signal centered at 6.25 MHZ and having a bandwidth (BW) of 50 KHZ. For multipath delays of 5 μsec, the frequency peaks are separated by 200 KHZ. Accordingly, a filter bandwidth of 50 KHZ for band pass filter 53 is adequate to separate peaks and nulls. Envelope detector 54 comprising diode D1, capacitor C1 and resistor R1 receives the filtered output from band pass filter 53 and produces a direct current (DC) voltage V1. Preferred values for capacitor C1 and resistor R1 are 330 pf and 47 KΩ, respectively. As VCO 52 is swept in frequency, slowly varying DC voltage V1 provided by envelope detector 54 varies in proportion to the ripples in the signal caused by multipath conditions. Accordingly, the frequency separation between the ripples can be determined by observing variations in DC voltage V1. Consider for example a multipath delay of 5 μsec with peaks separated by 200 KHZ. With the 100 Hz triangular wave, the 6 MHZ span of VCO 52 is swept in half the period or 5 msec. This results in a ripple frequency separation of: (6 MHZ)/[(5 msec)×(200 KHZ)]=6000 HZ.

If VCO 52 control voltage is switched for the triangular wave to one or more specific DC voltages, specific frequencies of the IF signal can be measured at V1. In systems employing VSB demodulation, DC voltage V1 produced by envelope detector 54 can also be observed to determine the state of the pilot carrier frequency. In particular, the voltage at the pilot carrier frequency can be compared to an average voltage across the pass band to detect potential demodulation problems. As previously indicated herein, recovery of the pilot carrier is critical in such systems in order to obtain a demodulation lock.

Buffer amplifier 55 receives the ripples from the envelope detector 54 and performs a signal buffering and amplification operation thereon. RC filter 56 comprising capacitor C2 and resistors R2 and R3 receives outputs from buffer amplifier 55. Preferred values for capacitor C2 and resistors R2 and R3 are 1500 pf, 47 KΩ and 47 KΩ, respectively. RC filter 56 performs a filtering operation to boost the high frequency components (e.g., frequencies above 2120 MHZ) of the ripples which correspond to multipath components having longer time delays. These longer time delay components generally cause more serious signal reception problems.

Buffer amplifier 57 receives the filtered ripple outputs from RC filter 56 and performs a signal buffering and amplification operation thereon. Envelope detector 58 comprising diode D2, capacitor C3 and resistor R4 receives outputs from buffer amplifier 57. Preferred values for capacitor C3 and resistor R4 are 0.068 µf and 220 KΩ, respectively. Envelope detector 58 produces DC voltage V2 proportional to the peak-to-peak amplitude of the ripples.

Multipath detection unit 24 enables a control function in response to the frequency separation of the ripples and the peak-to-peak amplitude of the ripples represented by DC voltages V1 and V2, respectively. In other words, the present invention uses indications of the frequency separation of the ripples represented by V1, and the peak-to-peak amplitude of the ripples represented by V2 as means by which to assess multipath conditions and provide corrective action. This control function may be performed in various ways.

According to a preferred embodiment as shown in FIG. 1, multipath detection unit 24 controls antenna 30 via antenna controller 31 to effectuate a change in the directivity, gain and/or polarization of antenna 30. Signals from two antennas may also be selected or combined to achieve this effect as well. For the reception of digital television signals, multipath detection unit 24 provides DC voltages V1 and V2 to antenna controller 31. Antenna controller 31 compares DC voltage V2 to an average value of DC voltage V1 across the pass band to assess multipath conditions. In this case, it has been recognized that values of V2 divided by V1 (average across pass band) less than 0.3 are generally acceptable. According to another variation of this embodiment, antenna controller 31 may simply compare DC voltage V2 to a predetermined value to assess multipath conditions. Of course, other methods of evaluating DC voltages V1 and V2 may be employed in accordance with principles of the present invention. As a general principle, however, it is desirable to minimize DC voltage V2. The comparisons made by antenna controller 31 are preferably made for at least 8 different antenna positions uniformly spaced over 360 degrees, which collectively cover the entire directional range of antenna 30. That is, antenna controller 31 should perform a comparison at each of the individual antenna positions to determine which position results in the least amount of multipath distortion.

Once a desirable position for antenna 30 is obtained, multipath detection unit 24 may control the tuning of analog filters in tuner 21. This action may be employed to mitigate pass band tilts (i.e., lower frequency side of band is higher than higher frequency side of band, or vice-versa) caused by relatively short multipath signals. In this control scheme, multipath detection unit 24 provides DC voltages V1 and V2 to tuner 21 which performs comparisons in the same or similar manner as antenna controller 31 to determine which analog filter setting results in the least amount of multipath distortion. That is, tuner 21 iteratively adjusts its filter settings and performs comparisons in the aforementioned manner to determine which filter setting is best. Of course, other parameters of television signal receiver 20 and/or antenna 30 may also be adjusted to reduce multipath effects according to principles of the present invention.

According to another preferred embodiment, DC voltages V1 and V2 are digitized by an analog-to-digital converter (not shown) and then processed by a microprocessor (not shown) to assess multipath conditions. In this embodiment, a microprocessor may be programmed to perform control functions such as the ones described herein to select settings of television signal receiver 20 and/or antenna 30 which result in the least amount of multipath distortion.

Figure 4:
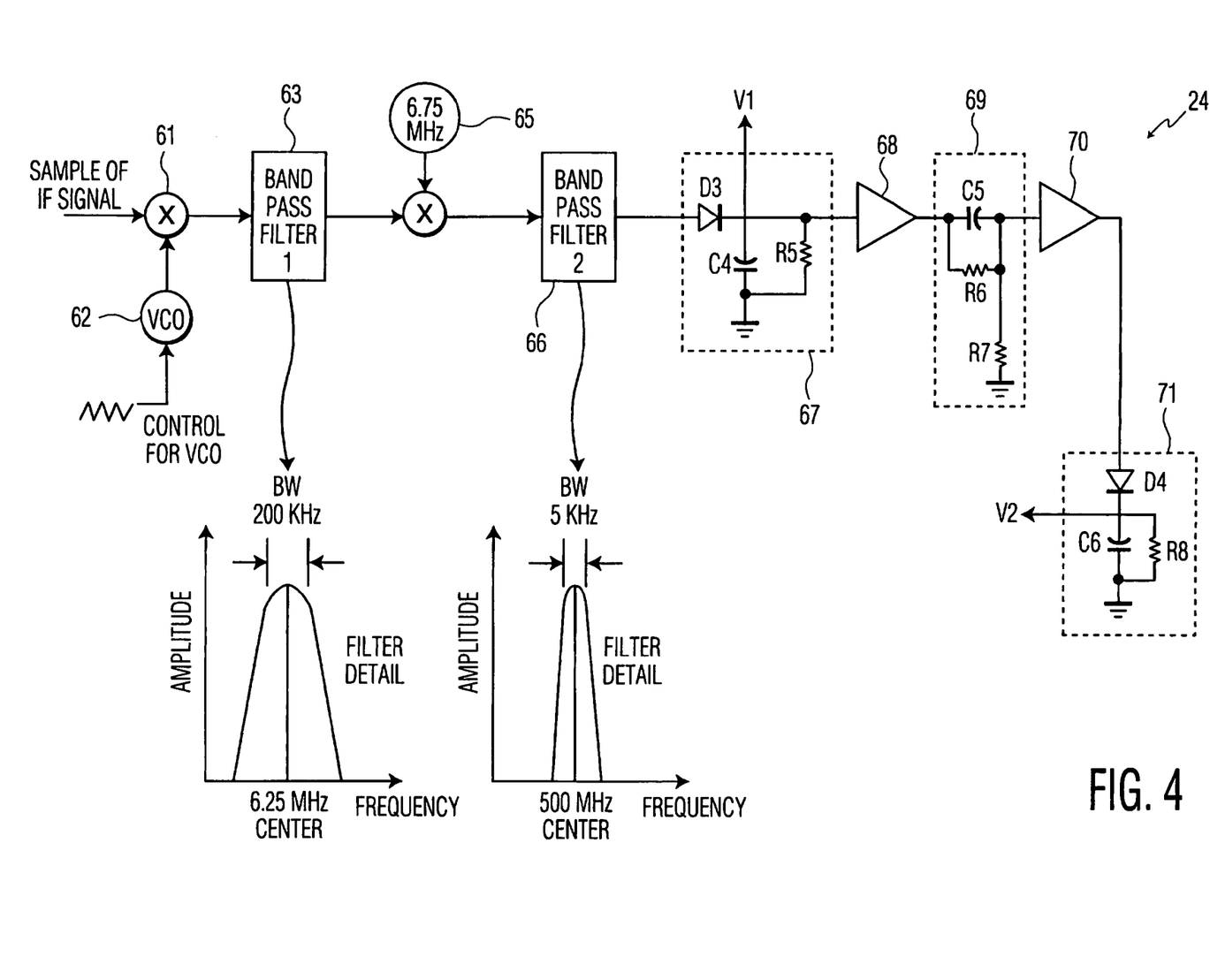
FIG. 4 is a schematic diagram illustrating details of a second embodiment of a multipath detection unit constructed according to principles of the present invention.

Referring to FIG. 4, a diagram illustrates details of a second embodiment of multipath detection unit 24 constructed according to principles of the present invention. This second embodiment is designed to detect multipath signals having longer time delays. In particular, for multipath signals having delay times exceeding 10 microseconds, the frequency of the ripple is 100 KHZ or less. As a practical matter, a 6.25 MHz filter such as band pass filter 53 of FIG. 3 becomes difficult to physically realize for bandwidths less than 50 KHz. If the bandwidth of the filter exceeds the ripple separation, the ripple is not detected. Accordingly, the second embodiment shown in FIG. 4 includes a frequency conversion to 500 KHz, thereby enabling a second filter centered at that frequency to be used with a much narrower bandwidth. A detailed description of this second embodiment will now be provided with reference to FIG. 4.

In FIG. 4, mixer 61 receives a sample of an IF signal provided by IF amplifier 23 of FIG. 1. Mixer 61 mixes the received IF signal with a signal provided by voltage-controlled oscillator (VCO) 62 to convert the received IF signal to a lower frequency. According to an exemplary embodiment, a 20 Hz triangular wave is used to sweep VCO 62 between 47.25 MHz and 53.25 MHz. For this embodiment, the frequency of the triangular wave is reduced to allow a narrower filter to follow amplitude variations. Band pass filter 63 receives and filters the frequency converted IF signal provided by mixer 61 to separate a portion of the IF signal in the 6.25 MHz range. Details regarding operation of band pass filter 63 are graphically depicted in FIG. 4. In particular, band pass filter 63 produces a filtered output signal centered at 6.25 MHz and having a bandwidth (BW) of 200 KHZ.

Mixer 64 receives the filtered output signal provided by band pass filter 63 and mixes the filtered output with a 6.75 MHZ signal provided by local oscillator 65 to convert the filtered signal to a lower frequency. Another band pass filter 66 receives and filters the frequency converted signal provided by mixer 64 to separate a portion of the signal in the 500 KHZ range. Details regarding operation of band pass filter 66 are also graphically depicted in FIG. 4. In particular, band pass filter 66 produces a filtered output signal centered at 500 KHZ and having a bandwidth (BW) of 5 KHZ.

Envelope detector 67 comprising diode D3, capacitor C4 and resistor R5 receives the filtered output from band pass filter 66 and produces a direct current (DC) voltage corresponding to the signal envelope. Preferred values for capacitor C4 and resistor R5 are 680 pf and 47 KΩ, respectively. As local oscillator 65 is swept in frequency, the DC voltage measured by envelope detector 67 varies in proportion to the ripples in the signal caused by multipath conditions. Accordingly, the frequency separation between the ripples can be determined by observing DC voltage V1. Consider for example a multipath delay of 10 µsec with peaks separated by 100 KHZ. With the 20 Hz triangular wave, the 6 MHZ span of VCO 62 is swept in half the period or 25 msec. This results in a ripple frequency separation of: (6 MHZ)/[(25 msec)×(100 KHZ)]=2400 Hz.

Buffer amplifier 68 receives the ripples and performs a signal buffering and amplification operation thereon. RC filter 69 comprising capacitor C5 and resistors R6 and R7 receives outputs from buffer amplifier 68. Preferred values for capacitor C5 and resistors R6 and R7 are 2200 pf, 47 KΩ and 47 KΩ, respectively. RC filter 69 performs a filtering operation to boost certain frequency components (e.g., frequencies above 1500 Hz) of the ripples. For many current equalizer designs, multipath delays greater than 10 μsec can not be corrected. Therefore, by accentuating frequencies greater than 1500 HZ, the present invention enables antenna and receiver settings to be established and avoided that are beyond the capabilities of current digital equalizers.

Buffer amplifier 70 receives the filtered ripple outputs from RC filter 69 and performs a signal buffering and amplification operation thereon. Envelope detector 71 comprising diode D4, capacitor C6 and resistor R8 receives outputs from buffer amplifier 70. Preferred values for capacitor C6 and resistor R8 are 0.18 μf and 220 KΩ, respectively. Envelope detector 71 produces a DC voltage proportional to the peak-to-peak amplitude of the ripples. The embodiment of FIG. 4 enables control of antenna 30 and/or tuner 21 in the same manner as the embodiment of FIG. 3.

The embodiments of FIGS. 3 and 4 demonstrate a variation in performance parameters. While the embodiment of FIG. 3 is less complex, it can detect moderately long multipath components and produces an output indication with less time delay from application of an input signal. The embodiment of FIG. 4, while more complex and requiring a slightly longer measurement time, can detect multipath components that are especially detrimental to the system, especially the digital equalizer. Furthermore, the embodiment of FIG. 4 can be used to sweep only a portion (e.g., 1 MHZ) of the signal. By measuring only a portion of the band for longer multipath components, the measurement can be made more rapidly. Accordingly, the use of both embodiments in a television signal receiver may be desirable.

Figure 5:
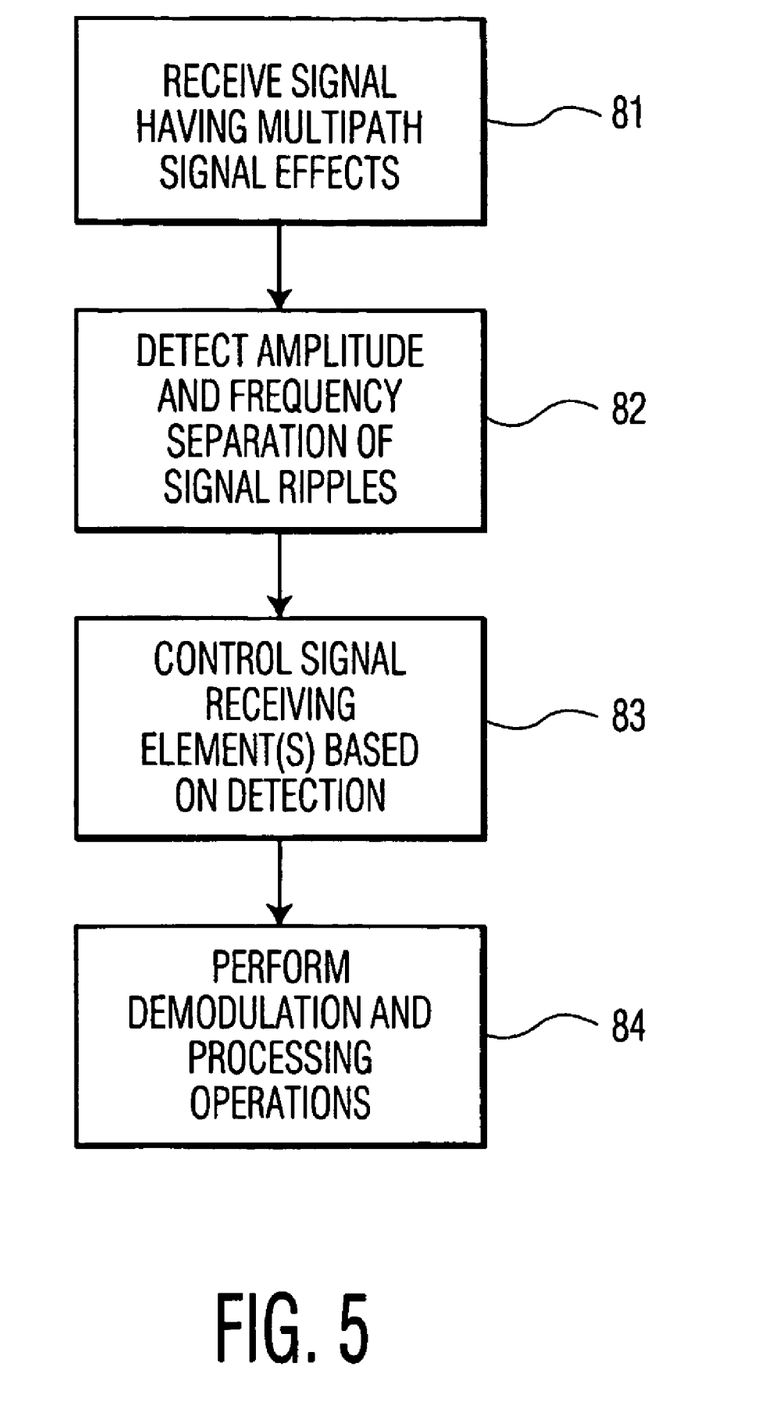
FIG. 5 is a flowchart illustrating exemplary steps for practicing the present invention.

Referring to FIG. 5, a flowchart illustrating exemplary steps for practicing the present invention is shown. For purposes of explanation and example, the flowchart of FIG. 5 will be described in relation to television signal receiver shown in FIG. 1. At step 81, television signal receiver 20 receives a signal such as a VSB modulated digital television signal having multipath signal effects represented by a plurality of ripples in the received signal. At step 82, multipath detection unit 24 detects the amplitude of at least one of the ripples, and also detects the frequency separation between at least two of the ripples. Next, at step 83, multipath detection unit 24 controls at least one of antenna 30 and tuner 21 in response to the detection. Then, after at least one signal receiving element has been controlled, demodulation and processing unit 25 performs demodulation and processing (e.g., equalization) operations on received signals, at step 84.

As described herein, the present invention improves signal reception by reducing multipath signal effects prior to demodulation and equalization. By doing so, the present invention advantageously reduces the probability of failing to obtain a demodulation lock in the reception of digital television signals. The phrase "television signal receiver" as used herein is intended to encompass any apparatus, with or without display, capable of receiving television signals. For example, television signal receivers include, but not limited to, television sets, video tape recorders (VTR), set-top boxes, and digital versatile disk (DVD) recorders. The principles are also applicable to other forms of digital modulation such as Quadrature Amplitude Modulation (QAM).

While this invention has been described as having a preferred design, the present invention can be further modified within the spirit and scope of this disclosure. For example, while the present invention is particularly applicable to digital television signal receivers, it may also be applied to television signal receivers employing the NTSC or other analog format. In particular, the techniques described herein can be used to measure the levels of video and audio carriers. The antenna and/or other receiver parameters can be adjusted to achieve a nominal ratio of 10 dB between these carriers corresponding to current broadcast practice. Further, if interference to a digital signal from an NTSC or other analog signal is incurred, the resulting cross-modulation or signal leakage will produce an indication similar to the multipath effects and the principles of the present invention may be used to minimize such interference. This application is therefore intended to cover any variations, uses, or adaptations of the invention using its general principles. Further, this application is intended to cover such departures from the present disclosure as come within known or customary practice in the art to which this invention pertains and which fall within the limits of the appended claims. For example, the principles of the present invention can be utilized to solve the multipath problems associated with digital ratio broadcast receivers.

The invention claimed is:

1. An apparatus comprising:
    tuning means coupled to a source of RF signal for receiving a digital RF signal from said source, said digital RF signal having a plurality of ripples caused by multipath signal effects;
    multipath detection means for detecting the amplitude of at least one of said ripples and the frequency separation between at least two of said ripples; and
    said multipath detection means controlling at least one of said tuning means and said source in response to said detection of said amplitude and said frequency separation.

2. The apparatus of claim 1, wherein said source includes an antenna.

3. The apparatus of claim 1, wherein said tuning means includes circuitry internal to a tuner module.

4. The apparatus of claim 1 further comprising demodulating means for demodulating an output of said tuning means after said multipath detection means controls at least one of said tuning means and said source.

5. The RF signal receiver of claim 1, wherein said digital RF signal includes a vestigial sideband modulated television signal.

6. An apparatus comprising:
    tuning means coupled to a source of RF signal for receiving an RF signal from said source, said RF signal having multipath signal effects;
    multipath detection means for detecting the amplitude of a picture carrier signal and the amplitude of a sound carrier signal; and
    said multipath detection means controlling at least one of said tuning means and said source in response to said detection of the amplitudes of said respective picture and sound carriers.

7. The apparatus of claim 6, wherein said source includes an antenna.

8. The apparatus of claim 6, wherein said tuning means includes circuitry internal to a tuner module.

9. The apparatus of claim 6 further comprising demodulating means for demodulating an output of said tuning means after said multipath detection means controls at least one of said tuning means and said source.

10. An apparatus comprising:
  a tuner coupled to a source of RF signal for receiving a digital RF signal from said source, said digital RF signal having a plurality of ripples caused by multipath signal effects;
  multipath detector for detecting the amplitude of at least one of said ripples and the frequency separation between at least two of said ripples; and
  said multipath detector controlling at least one of said tuner and said source in response to said detection of said amplitude and said frequency separation.

11. The apparatus of claim 10, wherein said source includes an antenna.

12. The apparatus of claim 10 further comprising demodulator for demodulating an output of said tuner after said multipath detector controls at least one of said tuner and said source.

13. The apparatus of claim 10, wherein said digital RF signal includes a vestigial sideband modulated television signal.

14. A method for controlling signal reception, comprising the steps of:
  receiving a digital RF signal from a source of RF signal, said digital RF signal having a plurality of ripples caused by multipath signal effects;
  detecting the amplitude of at least one of said ripples and the frequency separation between at least two of said ripples; and
  controlling at least one of tuning means and said source in response to said detection of said amplitude and said frequency separation.

15. The method of claim 14, wherein said source includes an antenna.

16. The method of claim 14, wherein said tuning means includes circuitry internal to a tuner module.

17. The method of claim 14, further comprising a step of:
  demodulating an output of said tuning means after controlling at least one of said tuning means and said source.

18. The method of claim 12, wherein said digital RF signal is a vestigial sideband modulated television signal.

* * * * *